(12) United States Patent
Wang et al.

(10) Patent No.: US 11,665,738 B2
(45) Date of Patent: May 30, 2023

(54) METHOD, DEVICE, AND APPARATUS FOR TRANSMITTING AND RECEIVING A REQUEST SIGNAL

(71) Applicant: DATANG MOBILE COMMUNICATIONS EQUIPMENT CO., LTD., Beijing (CN)

(72) Inventors: Jiaqing Wang, Beijing (CN); Fang-Chen Cheng, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 173 days.

(21) Appl. No.: 17/251,542

(22) PCT Filed: Apr. 22, 2019

(86) PCT No.: PCT/CN2019/083738
§ 371 (c)(1),
(2) Date: Dec. 11, 2020

(87) PCT Pub. No.: WO2019/237832
PCT Pub. Date: Dec. 19, 2019

(65) Prior Publication Data
US 2021/0259015 A1    Aug. 19, 2021

(30) Foreign Application Priority Data
Jun. 11, 2018    (CN) .......................... 201810597788.7

(51) Int. Cl.
*H04W 74/08* (2009.01)
*H04L 5/00* (2006.01)
*H04W 72/23* (2023.01)

(52) U.S. Cl.
CPC ....... *H04W 74/0808* (2013.01); *H04L 5/0048* (2013.01); *H04W 72/23* (2023.01)

(58) Field of Classification Search
CPC . H04W 16/14; H04W 72/0453; H04W 16/28; H04W 74/08; H04B 7/0408
See application file for complete search history.

(56) References Cited

U.S. PATENT DOCUMENTS

2005/0254513 A1* 11/2005 Cave .................... H04B 7/0408
                                                            370/278
2016/0073344 A1*  3/2016 Vutukuri ................. H04L 5/001
                                                            370/252
(Continued)

FOREIGN PATENT DOCUMENTS

CN    103188041 A    7/2013
CN    103428858 A   12/2013
(Continued)

OTHER PUBLICATIONS

International Search Report for International Application No. PCT/CN2019/083738 dated Jul. 23, 2019.
(Continued)

*Primary Examiner* — Yee F Lam
(74) *Attorney, Agent, or Firm* — Meunier Carlin & Curfman LLC

(57) ABSTRACT

Disclosed is a method, device, apparatus for transmitting and receiving a request signal, comprising: a base station determines a channel occupancy request signal to be transmitted, the channel occupancy request signal being a request signal for requesting channel occupancy to a terminal after the base station executes a listen-before-talk operation on the direction corresponding to at least one beam; the base station schedules transmission of the channel occupancy request signal on a downlink control channel; the terminal detects the downlink control channel that schedules the transmission of the channel occupancy request signal; and the terminal receives the channel occupancy request signal according to a detection result. The use of the present
(Continued)

invention overcomes a defect of the prior art that has no design for the channel occupancy request signal, and implements transmission of an eNB channel occupancy request signal. Furthermore, the solution further provides a solution that can achieve the lowest power consumption.

13 Claims, 4 Drawing Sheets

(56) References Cited

U.S. PATENT DOCUMENTS

| | | | |
|---|---|---|---|
| 2016/0227578 A1* | 8/2016 | Lee | H04W 74/004 |
| 2017/0048879 A1* | 2/2017 | Zhang | H04W 16/14 |
| 2017/0202019 A1* | 7/2017 | You | H04W 16/14 |
| 2017/0273111 A1* | 9/2017 | Wong | H04W 74/0816 |
| 2018/0054841 A1* | 2/2018 | Li | H04L 41/0806 |
| 2018/0115305 A1* | 4/2018 | Islam | H04B 7/0417 |
| 2018/0115994 A1* | 4/2018 | Islam | H04W 74/0816 |
| 2018/0359746 A1* | 12/2018 | Kim | H04W 74/008 |
| 2019/0124595 A1* | 4/2019 | Lei | H04W 52/028 |
| 2021/0007139 A1* | 1/2021 | Fu | H04L 41/0896 |
| 2021/0029552 A1* | 1/2021 | Murayama | H04W 16/14 |
| 2021/0037571 A1* | 2/2021 | Murayama | H04W 84/12 |
| 2021/0168862 A1* | 6/2021 | Murray | H04W 74/0816 |
| 2021/0235492 A1* | 7/2021 | Iyer | H04W 72/0453 |
| 2021/0289548 A1* | 9/2021 | Murray | H04W 72/042 |

FOREIGN PATENT DOCUMENTS

| | | |
|---|---|---|
| CN | 103997762 A | 8/2014 |
| CN | 106465425 A | 2/2017 |
| CN | 106658751 A | 5/2017 |
| CN | 107079464 A | 8/2017 |
| CN | 107623919 A | 1/2018 |
| WO | 2015165084 A1 | 11/2015 |

OTHER PUBLICATIONS

CATT. "Channel Access Procedures for NR Unlicensed Operations" 3GPP TSG RAN WG1 Meeting #3 R1-1806317, May 25, 2018.
Interdigital Inc. "On LBT for Beam-Based Transmission for NR-U" 3GPP TSG RAN WG1 Meeting #92bis R1-1804885, Apr. 20, 2018.
ZTE. "Discussion on Channel Access Mechanism for NR-U" 3GPP TSG RAN WG1 Meeting #93 R1-1806462, May 25, 2018.
Samsung. "Potential physical layer procedures for NR-U" 3GPP TSG RAN WG1 Meeting #92 R1-1804405, Apr. 20, 2018.
Samsung. "Channel Access for NR Unlicensed Operation" 3GPP TSG-TAN WG1 Meeting #AH 1801 R1-1800478, Jan. 26, 2018.
Qualcomm Incorporated, "Channel access procedures for NR unlicensed," 3GPP TSG RAN WG1 Meeting #93, R1-1807389, Agenda item: 7.6.4.1, Busan, Korea, May 21-25, 2018.
Samsung, "Channel access procedures for NR-U," 3GPP TSG-RAN WG1 Meeting #93, R1-1806761, Agenda item 7.6.4.1, Busan, Korea, May 21-25, 2018.
Ericsson, "Channel access mechanisms," 3GPP TSG-RAN WG1 Meeting #93, Tdoc R1-1806253, Agenda item 7.6.4.1, Busan, Korea, May 21-25, 2018.

* cited by examiner

METHOD, DEVICE, AND APPARATUS FOR TRANSMITTING AND RECEIVING A REQUEST SIGNAL

The present application is a US National Stage of International Application No. PCT/CN2019/083738, filed Apr. 22, 2019, which claims priority to Chinese Patent Application No. 201810597788.7, filed with the Chinese Patent Office on Jun. 11, 2018 and entitled "Method, Device, and Apparatus for Transmitting and Receiving a Request Signal", which is hereby incorporated by reference in its entirety.

FIELD

The invention relates to the field of wireless communication technologies, and in particular to a method, device, and apparatus for transmitting and receiving a request signal.

BACKGROUND

The unlicensed spectrum has no specific application system planned, and can be shared by a variety of wireless communication systems. The existing communication systems which uses the unlicensed spectrum mainly include IEEE standardized Bluetooth, WiFi, and Long Term Evolution in unlicensed spectrum (LTE-U) system standardized by 3GPP. A variety of systems use the shared unlicensed spectrum resources by preempting resources.

In order to ensure that the LTE-U coexists friendly with WiFi, the 3GPP has launched an in-depth discussion on the Listen Before Talk (LBT) technology and provides four LBT solutions.

Cat.1: No LBT.
Cat.2: LBT without random back-off.
Cat.3: LBT with random back-off with fixed size of contention window.
Cat.4: LBT with random back-off with variable size of contention window.

Finally, two LBT mechanisms are standardized, namely 3GPP-defined LBT cat.2 and LBT cat.4.

The transmission distance of the unlicensed spectrum is generally relatively short, and the coverage radius may no longer be the main reason for beam transmission, but the introduction of beam transmission brings new variables to the LBT mechanism. For the new radio access technology based on the unlicensed spectrum of beam transmission (NR-U), it is obvious to consider the direction-related LBT, i.e., directional LBT. The execution of the direction-based LBT will provide more transmission opportunities for the NR-U.

The disadvantage of the prior art is as follows: in order to avoid the hidden node problem, the RTS/CTS handshake mechanism can be applied to the NR-U, but there is no solution for transmitting and receiving the channel occupancy request signal in the prior art, and further, there is no technical solution for designing the channel occupancy request signal based on power consumption.

SUMMARY

The invention provides a method, device and apparatus for transmitting and receiving a request signal, so as to solve the problem of no solution for transmitting and receiving the channel occupancy request signal in the prior art.

An embodiment of the invention provides a method for transmitting a request signal, including:

determining, by a base station, a channel occupancy request signal to be transmitted, wherein the channel occupancy request signal is a request signal for requesting channel occupancy to a user equipment after the base station performs a Listen-Before-Talk, LBT, in a direction corresponding to at least one beam;

scheduling, by the base station, transmission of the channel occupancy request signal on a downlink control channel.

In an implementation, during the scheduling on the downlink control channel, control information on the downlink control channel is scrambled by an RNTI dedicated to the channel occupancy request signal.

In an implementation, the RNTI is associated with a TA ID or WUS area ID.

In an implementation, the method further includes: transmitting a UE specific sequence or a cell specific sequence before transmitting the control information scrambled by the RNTI.

In an implementation, the UE specific sequence is a UE specific reference signal; or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with the pattern of the DMRS signal; or the reference signal is a repetition of the DMRS signal in time and frequency domains; or the reference signal reuses the DMRS signal.

In an implementation, the method further includes one or a combination of the following processes of mapping the UE specific sequence in frequency domain:

the frequency-domain transmission resources of the UE specific sequence is a function of the PDCCH frequency-domain transmission resources corresponding to the UE; or the UE specific sequence occupies the full bandwidth for transmission; or the UE specific sequence is transmitted in the interlace manner.

In an implementation, the method further includes:
scrambling the control information on the downlink control channel during the scheduling on the downlink control channel;

transmitting a cell specific sequence before transmitting the scrambled control information.

In an implementation, the downlink control channel is a PDCCH;

the number of PDCCH candidates in a PDCCH search space of the PDCCH transmitting the control information is a fixed value.

In an implementation, the control information includes one or a combination of:

information of beam on which LBT is successful, 1-bit indication information of the channel occupancy request signal, and information related to a channel occupancy allow signal fed back by the user equipment.

In an implementation, the information related to the channel occupancy allow signal fed back by the user equipment includes one or a combination of:

frequency-domain information of the fed-back channel occupancy allow signal, time-domain information of the fed-back channel occupancy allow signal, LBT-related information used by the fed-back channel occupancy allow signal, and interlace information, allocated to the UE, of transmission of the fed-back channel occupancy allow signal.

An embodiment of the invention provides a method for receiving a request signal, including:

detecting, by a user equipment, a downlink control channel that schedules transmission of a channel occupancy request signal, wherein the channel occupancy request signal is a request signal for requesting channel occupancy to the user equipment after a base station performs an LBT in a direction corresponding to at least one beam;

receiving, by the user equipment, the channel occupancy request signal according to a detection result.

In an implementation, during the scheduling on the downlink control channel, control information on the downlink control channel is scrambled by an RNTI dedicated to the channel occupancy request signal.

In an implementation, the RNTI is associated with a TA ID or WUS area ID.

In an implementation, the method further includes: detecting a UE specific sequence or a cell specific sequence before detecting the control information scrambled by the RNTI.

In an implementation, the UE specific sequence is a UE specific reference signal; or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with the pattern of the DMRS signal; or the reference signal is a repetition of the DMRS signal in time and frequency domains; or the reference signal reuses the DMRS signal.

In an implementation, the method further includes one or a combination of the following processes of mapping the UE specific sequence in frequency domain:

the frequency-domain transmission resources of the UE specific sequence is a function of the PDCCH frequency-domain transmission resources corresponding to the UE; or the UE specific sequence occupies the full bandwidth for transmission; or the UE specific sequence is transmitted in the interlace manner.

In an implementation, the method further includes: detecting a cell specific sequence before detecting the scrambled control information.

In an implementation, the user equipment detects the downlink control channel that schedules the transmission of the channel occupancy request signal according to a statically or semi-statically configured search space.

In an implementation, the downlink control channel is a PDCCH;

the number of PDCCH candidates in a PDCCH search space of the detected PDCCH is a fixed value.

In an implementation, the control information includes one or a combination of:

Information of beam on which LBT is successful, 1-bit indication information of the channel occupancy request signal, and information related to a channel occupancy allow signal fed back by the user equipment.

In an implementation, the information related to the channel occupancy allow signal fed back by the user equipment includes one or a combination of:

frequency-domain information of the fed-back channel occupancy allow signal, time-domain information of the fed-back channel occupancy allow signal, LBT-related information used by the fed-back channel occupancy allow signal, and interlace information, allocated to the UE, of transmission of the fed-back channel occupancy allow signal.

An embodiment of the invention provides a base station, including:

a processor configured to read programs in a memory to perform the process of:

determining a channel occupancy request signal to be transmitted, wherein the channel occupancy request signal is a request signal for requesting channel occupancy to a user equipment after the base station performs an LBT in a direction corresponding to at least one beam;

a transceiver configured to receive and transmit data under control of the processor to perform the process of:

scheduling transmission of the channel occupancy request signal on a downlink control channel.

In an implementation, during the scheduling on the downlink control channel, control information on the downlink control channel is scrambled by an RNTI dedicated to the channel occupancy request signal.

In an implementation, the RNTI is associated with a TA ID or WUS area ID.

In an implementation, the process further includes: transmitting a UE specific sequence or a cell specific sequence before transmitting the control information scrambled by the RNTI.

In an implementation, the UE specific sequence is a UE specific reference signal, or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with the pattern of the DMRS signal; or the reference signal is a repetition of the DMRS signal in time and frequency domains; or the reference signal reuses the DMRS signal.

In an implementation, the process further includes one or a combination of the following processes of mapping the UE specific sequence in frequency domain:

the frequency-domain transmission resources of the UE specific sequence is a function of the PDCCH frequency-domain transmission resources corresponding to the UE; or the UE specific sequence occupies the full bandwidth for transmission; or the UE specific sequence is transmitted in the interlace manner.

In an implementation, the process further includes:

scrambling the control information on the downlink control channel during the scheduling on the downlink control channel:

transmitting a cell specific sequence before transmitting the scrambled control information.

In an implementation, the downlink control channel is a PDCCH;

the number of PDCCH candidates in a PDCCH search space of the PDCCH transmitting the control information is a fixed value.

In an implementation, the control information includes one or a combination of;

information of beam on which LBT is successful, 1-bit indication information of the channel occupancy request signal, and information related to a channel occupancy allow signal fed back by the user equipment.

In an implementation, the information related to the channel occupancy allow signal fed back by the user equipment includes one or a combination of:

frequency-domain information of the fed-back channel occupancy allow signal, time-domain information of the fed-back channel occupancy allow signal, LBT-related information used by the fed-back channel occupancy allow signal, and interlace information, allocated to the UE, of transmission of the fed-back channel occupancy allow signal.

An embodiment of the invention provides a user equipment, including:

a processor configured to read programs in a memory to perform the process of:

detecting a downlink control channel that schedules transmission of a channel occupancy request signal, wherein the channel occupancy request signal is a request signal for requesting channel occupancy to a user equipment after a base station performs an LBT in a direction corresponding to at least one beam:

a transceiver configured to receive and transmit data under control of the processor to perform the process of:

receiving the channel occupancy request signal according to a detection result.

In an implementation, during the scheduling on the downlink control channel, control information on the downlink control channel is scrambled by an RNTI dedicated to the channel occupancy request signal.

In an implementation, the RNTI is associated with a TA ID or WUS area ID.

In an implementation, the process further includes: detecting a UE specific sequence or a cell specific sequence before detecting the control information scrambled by the RNTI.

In an implementation, the UE specific sequence is a UE specific reference signal; or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with the pattern of the DMRS signal; or the reference signal is a repetition of the DMRS signal in time and frequency domains, or the reference signal reuses the DMRS signal.

In an implementation, the process further includes one or a combination of the following processes of mapping the UE specific sequence in frequency domain:

the frequency-domain transmission resources of the UE specific sequence is a function of the PDCCH frequency-domain transmission resources corresponding to the UE; or the UE specific sequence occupies the full bandwidth for transmission; or the UE specific sequence is transmitted in the interlace manner.

In an implementation, the process further includes: detecting a cell specific sequence before detecting the scrambled control information.

In an implementation, the downlink control channel that schedules the transmission of the channel occupancy request signal is detected according to a statically or semi-statically configured search space.

In an implementation, the downlink control channel is a PDCCH;

the number of PDCCH candidates in a PDCCH search space of the detected PDCCH is a fixed value.

In an implementation, the control information includes one or a combination of:

information of beam on which LBT is successful, 1-bit indication information of the channel occupancy request signal, and information related to a channel occupancy allow signal fed back by the user equipment.

In an implementation, the information related to the channel occupancy allow signal fed back by the user equipment includes one or a combination of;

frequency-domain information of the fed-back channel occupancy allow signal, time-domain information of the fed-back channel occupancy allow signal, LBT-related information used by the fed-back channel occupancy allow signal, and interlace information, allocated to the UE, of transmission of the fed-back channel occupancy allow signal.

An embodiment of the invention provides an apparatus for transmitting a request signal, including:

a determining module configured to determine a channel occupancy request signal to be transmitted, wherein the channel occupancy request signal is a request signal for requesting channel occupancy to a user equipment after a base station performs an LBT in a direction corresponding to at least one beam;

a transmission module configured to schedule transmission of the channel occupancy request signal on a downlink control channel.

An embodiment of the invention provides an apparatus for receiving a request signal, including:

a detection module configured to detect a downlink control channel that schedules transmission of a channel occupancy request signal, wherein the channel occupancy request signal is a request signal for requesting channel occupancy to a user equipment after a base station performs an LBT in a direction corresponding to at least one beam:

a receiving module configured to receive the channel occupancy request signal according to a detection result.

The invention has the following beneficial effects.

In the technical solution according to the invention, after the base station determines the channel occupancy request signal to be transmitted, the base station transmits the channel occupancy request signal on the downlink control channel, thereby overcoming the defect of no design for the channel occupancy request signal in the prior art, and achieving the transmission of the channel occupancy request signal of the eNB.

Further, the solution further provides a scheme that can achieve the lowest power consumption.

BRIEF DESCRIPTION OF THE DRAWINGS

The accompanying drawings illustrated here are used to provide the further understanding of the invention and constitute a part of the invention, and the schematic embodiments of the invention and the illustration thereof are used to explain the invention but not limit the invention improperly. In the accompanying drawings.

DETAILED DESCRIPTION

Figure 1:
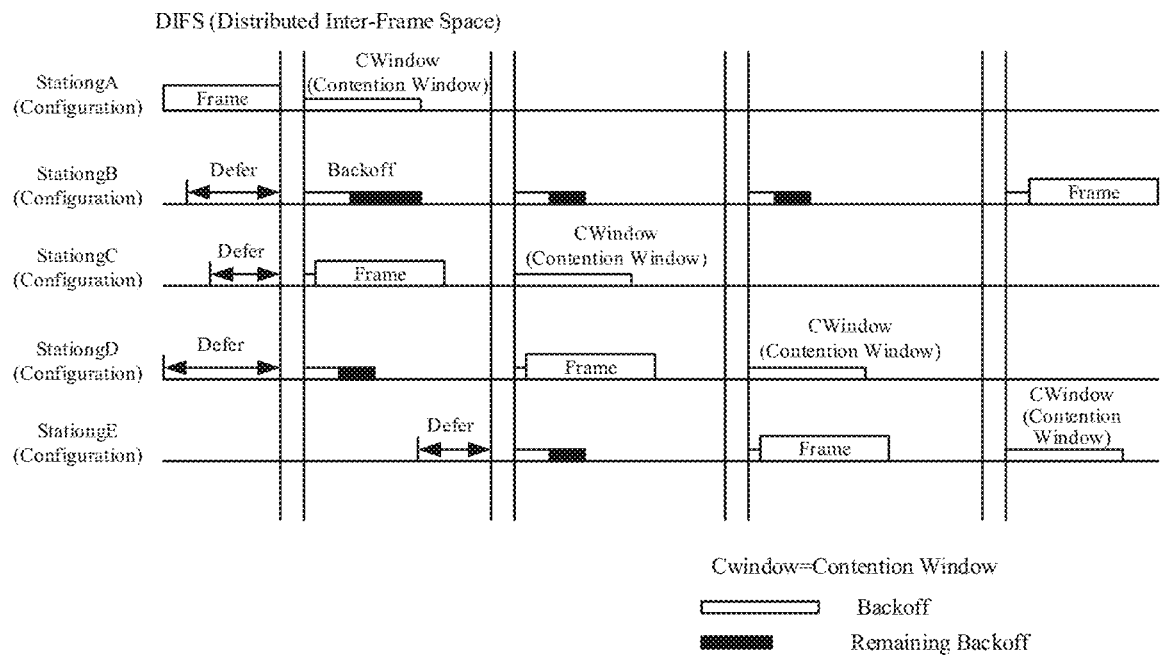
FIG. 1 is a schematic diagram of a way for WiFi to preempt resources on the unlicensed spectrum according to an embodiment of the invention.

In order to make the objects, technical solutions and advantages of the invention clearer, the technical solutions in the embodiments of the invention will be described clearly and completely below in combination with the accompanying drawings. Obviously the described embodiments are a part of the embodiments of the invention but not all the embodiments. Based upon the embodiments of the invention, all of other embodiments obtained by those ordinary skilled in the art without creative work pertain to the protection scope of the invention.

It should be understood that the technical solutions of the invention can be applied to various communication systems, for example, Global System of Mobile communication (GSM) system, Code Division Multiple Access (CDMA) system, Wideband Code Division Multiple Access (WCDMA) system. General Packet Radio Service (GPRS), Long Term Evolution (LTE) system, Advanced long term evolution (LTE-A) system, Universal Mobile Telecommunication System (UMTS), New Radio (NR) and the like.

It should be further understood that the User Equipment (UE) includes but not limited to a Mobile Station (MS), a mobile terminal, a mobile telephone, a handset, a portable equipment or the like in the embodiments of the invention. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the invention, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, wherein the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the invention.

The inventor noticed the followings in the inventive process.

The unlicensed spectrum has no specific application system planned, and can be shared by a variety of wireless communication systems. The existing communication systems which use the unlicensed spectrum mainly include IEEE standardized Bluetooth, WiFi, and Long Term Evolution in unlicensed spectrum (LTE-U) system standardized by 3GPP. A variety of systems use the shared unlicensed spectrum resources by preempting resources.

In order to ensure the friendly coexistence of various communication systems in the unlicensed spectrum, both WiFi and LTE-U use the LBT as the basic means of the LTE-U to compete for access.

The 802.11 system uses a channel access mechanism called Carrier Sense Multiple Access/Collision Avoidance (CSMA/CA) mechanism. FIG. 1 is a schematic diagram of a way for WiFi to preempt resources on the unlicensed spectrum, and the way for the WiFi system to preempt resources on the unlicensed spectrum is as shown in FIG. 1. At first, the channel is monitored. When the channel idle time reaches the Distributed Inter-Frame Space (DIFS), the current channel is determined to be an idle channel, and then each station which waits to access the channel enters a random back-off phase, so as to avoid the collisions of multiple stations on the same resources. In addition, in order to ensure the fairness, it is also stipulated that each station cannot occupy spectrum resources for a long time. When a certain time or the upper limit of data transmission amount is reached, the resources need to be released so that other WiFi or LTE systems can preempt resources.

In the WiFi system, two Access Points (AP) far from each other cannot hear each other, and transmit data to two stations (STAs) independently, but the two STAs are very close. At this time, two WiFis become the mutual hidden nodes. In order to overcome the hidden node problem, the WiFi also supports the Request-To-Send/Clear-To-Send protocol (RTS/CTS) handshake mechanism. That is, the AP broadcasts an RTS frame, and if the STA receives the RTS, it will reply with a CTS frame. The RTS/CTS handshake mechanism carries the time of occupying the channel during this transmission. Thus, the nearby nodes will stop accessing the channel after receiving the CTS, thereby avoiding collisions.

In order to coexist friendly with WiFi, the LTE-U has launched the deep discussion for the LBT technology. Finally, two LBT mechanisms are standardized, namely 3GPP-defined LBT cat.2 and LBT cat.4. The LBT cat.2 is similar to the FBE without using the random back-off mechanism, but uses the fixed CCA time such as 20 us; the LBT cat.4 is highly similar to the WiFi's CSMA/CA mechanism, the eNB firstly performs a CCA detection based on Energy Detection (ED), of which the time is configurable, where this CCA detection is called Initial CCA (ICCA). If the energy level of the ICCA is lower than a predetermined threshold, the channel is determined to be idle and the device performs the transmission immediately; otherwise, the current channel is occupied and the device needs to perform the Extension CCA (ECCA) detection. The eNB firstly generates a counter, the counter value of which is N, that needs to be counted down according to the size of the contention window q, the counter value is subtracted by 1 when an idle CCA slot is found, and the channel is accessed to initiate the data transmission process when the counter value is 0.

In order to increase the data rate and improve the coverage of high frequency bands, the Massive Multiple Input Multiple Output (Massive MIMO) technology is used in the New Radio access technology (NR), especially in the millimeter wave frequency band, where most transmission nodes adopt the beam-forming data transmission based on the Massive MIMO. The greatest feature of the beam-based transmission is, there are a plurality of possible transmission beams in space. The base station and the user equipment need to determine a best pair of transmitting and receiving beams. The NR specifies the initial access phase, where firstly the base station transmits the Synchronization Signal Block (SSB) on each beam, and the user equipment determines the best transmitting beam and feeds it back to the base station. During data transmission, the change of the beams for receiving the data may be configured semi-statically through the Media Access Control Control Element (MAC CE) or instructed to the user equipment through the Physical Downlink Control Channel (PDCCH).

Figure 2:
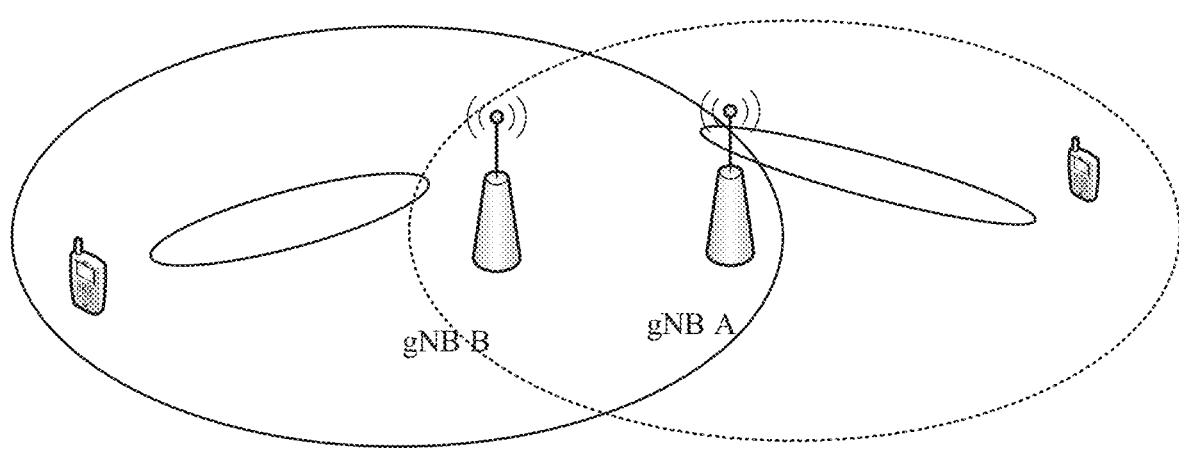
FIG. 2 is a schematic diagram of beam-based spatial multiplexing according to an embodiment of the invention.

The transmission distance of the unlicensed spectrum is generally relatively short, and the coverage radius may no longer be the main reason for beam transmission, but the introduction of beam-based transmission brings new variables to the LBT mechanism. The aforementioned CSMA/CA mechanism, and LBT cat.2 and LBT cat.4 channel access mechanisms adopted by WiFi and LTE-U actually belong to the omnidirectional LBT. For the new radio access technology based on the unlicensed spectrum of beam transmission (NR-U), it is obvious to consider the direction-related LBT, i.e., directional LBT. The execution of the direction-based LBT will provide more transmission opportunities for the NR-U. FIG. 2 is a schematic diagram of beam-based spatial multiplexing. As shown in FIG. 2, it is assumed that the gNB A, gNB and AP are very close. If the omnidirectional LBT is used, they can hear each other and only one node can access the channel at the same time. If the direction-based LBT is used, the gNB and WiFi may perform the transmissions in different beams at the same time without interfering with each other.

Figure 3:
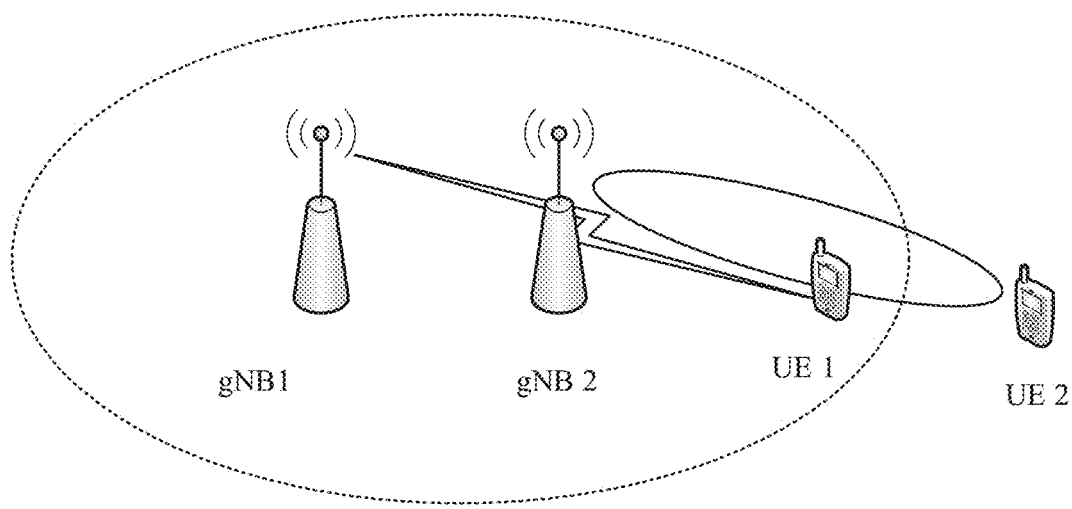
FIG. 3 is a schematic diagram of a coexistence scenario of LAA and NR-U according to an embodiment of the invention.

However, the direction-based LBT will bring more serious hidden node problem. FIG. 3 is a schematic diagram of the coexistence case of LAA and NR-U. As shown in FIG. 3, the omnidirectional transmission of Licensed Assisted Access (LAA) is used, where the eNB firstly access the channel and perform the transmission to the UE1, the receiving beams of the other gNB2 using the direction-based LBT cannot receive the signal transmitted by the gNB1, and the gNB2 considers that the channel is idle and accesses the channel to initiate the transmission to the UE2, so the signals transmitted by the eNB1 and gNB2 will collide at the UE1 and UE2. If the LAA eNB in FIG. 3 is replaced with an NR-U gNB, the same problem still exists.

As mentioned earlier, in order to avoid the hidden node problem, the WiFi proposes the RTS/CTS handshake mechanism. This RTS/CTS handshake mechanism can be applied to the NR-U. The base station performs the LBT in the beam direction and then transmits a channel occupancy request signal. After receiving the channel occupancy request signal successfully, the user equipment feeds back a channel occupancy allow signal. The base station receives the channel occupancy allow signal successfully, completes the handshake of the channel occupancy request signal/channel occupancy allow signal, starts accessing the channel, and performs data transmission. However, it is necessary to study how to design and transmit the channel occupancy request signal so that the power consumption can be lowest.

With the continuous growth of mobile data service amount, the spectrum resources are becoming more and more tight, and the usage of only licensed spectrum resources for network deployment and service transmission may no longer meet the service requirements. Therefore, the 3GPP has standardized the transmission of the LTE in the unlicensed frequency bands. At present, the first version of 5G has been frozen. Similar to the LTE-U, the application of the NR technologies of the licensed frequency bands to the unlicensed frequency bands requires the deep research according to the new features of 5G. At present, there is no clear solution for designing the channel occupancy request signal for power consumption in the NR system. Therefore, a solution for transmitting and receiving the request signal is provided in the embodiments of the invention. The specific embodiments of the invention will be illustrated below in combination with the drawings.

In the illustration process, the implementations at the user equipment and base station sides will be illustrated respectively, and then the instance implemented by both of them in cooperation is also given to better understand the implementations of the solution provided in the embodiments of the invention. Such illustration does not mean they must implement in cooperation or must implement alone. Actually, when the user equipment and the base station implement separately, they also solve the problems at the user equipment side and the base station side respectively, while the better technical effect may be obtained when they are used in combination.

Firstly, the implementations related to the channel occupancy request signal in the embodiments of the invention will be described.

The data transmission on the base station side may include: the base station transmits a channel occupancy request signal to the user equipment to request to occupy channel after performing the LBT in the direction corresponding to at least one beam; the base station transmits data on the beam transmitting the channel occupancy request signal after receiving the channel occupancy allow signal.

The signal feedback on the user equipment side may include: the user equipment receives a channel occupancy request signal transmitted by the base station to the user equipment on at least one beam, where the channel occupancy request signal is a signal to request to occupy the channel; the user equipment feeds back a channel occupancy allowing signal the base station on the beam receiving the channel occupancy request signal after receiving the channel occupancy request signal correctly.

In an implementation, the base station firstly transmits the channel occupancy request signal on multiple beams in sequence, and the user equipment replies the channel occupancy allow signal on multiple beams or one beam after receiving the channel occupancy request signal. The base station transmits the data after decoding the channel occupancy allow signal transmitted by the user equipment successfully.

In an implementation, the correct reception means that the UE can correctly decode the signal. If there is no other strong interference at the UE, it means that there is no other node that is performing the transmission near the UE; and similarly, if the UE can correctly decode the fed-back signal allowing occupancy, only the base station can decode it successfully and the base station can know that the feedback beams are sometimes inconsistent with the receiving beams. The handshake is successful only when the base station decodes the handshake signal correctly.

The implementations will be illustrated below in combination with examples.

First Example

In this example, the followings are on the base station side.

The beams that transmit the channel occupancy request signal are all or some of the beams of which the channels are detected to be idle after the base station performs LBT in chronological order in the direction corresponding to at least one beam.

The beams on which the base station performs LBT are all possible beams in the space, and/or some possible beams that are pre-determined and configured by the network.

The channel occupancy request signal includes one or a combination of, the information of the scheduled UEID, the beam ID of the beam that transmits the channel occupancy request signal, the location information of the beam that transmits the channel occupancy request signal in space, the channel occupancy time information of the beam that transmits the channel occupancy request signal, the resource configuration required when the user equipment feeds back the channel occupancy allow signal, the LBT type information required when the user equipment feeds back the channel occupancy allow signal, and the pilot information for channel quality measurement.

When receiving the channel occupancy allow signal on multiple beams, the base station selects the beam with the largest number of multiplexed users or the beam with the largest transmission capacity to perform the data transmission.

Correspondingly, the followings are on the user equipment side.

The channel occupancy allow signal includes one or a combination of: the information related to channel occupancy time, the ID information of the beam, the user equipment identification (UEID) information of this user equipment, and the beam-based Channel Quality Indicator (CQI) channel quality information.

Specifically, the base station firstly performs LBT operations in chronological order in the directions corresponding to multiple beams. The multiple beams can be all possible beams in the space, or some possible beams that are pre-determined and configured by the network. The case of only one beam can be considered as a special case and is not excluded, and may also be implemented in the same way; and the LBT may be the directional LBT.

The base station transmits the beam-based channel occupancy request signal on all or some of the beams of which the channels are detected to be idle, where the channel occupancy request signal may include: the information of the scheduled UEID; the information of the beam transmitting the channel occupancy request signal, where the information may further contain the location information of the beam in space (such as the angle of the beam and other related information that can determine the location of the beam) in addition to the beam ID; the channel occupancy time information, such as the initial occupancy time and the maximum channel occupancy time; the resource configuration required when the user equipment feeds back the channel occupancy allow signal, and the LBT type information required when the user equipment feeds back the channel occupancy allow signal; the pilot information for channel quality measurement.

After receiving the channel occupancy request signal based on a certain beam correctly, the user equipment will feed back the channel occupancy allow signal for the channel occupancy request signal of this beam. This channel occupancy allow signal can occupy an Orthogonal Frequency Division Multiplexing (OFDM) symbol. In addition to the information related to the channel occupancy time, this signal may further include the ID information of this beam, the UEID information, and the beam-based CQI channel quality information, such as estimated values of Received Signal Strength Indication (RSSI) and/or Reference Signal Received Power (RSRP)/Reference Signal Received Quality (RSRQ).

In fact, the beam-based CQI information is very important for the base station to determine whether there are hidden nodes on the beam, the beam-based CQI may be carried in the Uplink Control Information (UCI), and the examples of the pilot used by the beam-based CQI measurement may be the Channel State Information Reference Signal (CSI-RS) or the Demodulation Reference Signal (DMRS) contained in the Synchronization Signal Block (SSB).

Before not receiving the channel occupancy allow signal, the base station does not know whether it can access the channel, so the base station transmits the channel occupancy request signal on multiple beams through which the LBT passes at least before the base station receives the channel occupancy allow signal. Of course, the special case that the base station transmits the channel occupancy request signal on only one optimal beam is not excluded.

When receiving a signal, the user equipment can receive the channel occupancy request signal through multiple beams, and feed back the channel occupancy allow signal after the decoding is successful. After receiving the channel occupancy allow signal successfully, the base station determines that it can access the channel for data transmission.

If the user equipment decodes the channel occupancy request signal on multiple beams correctly, the user equipment can feed back the channel occupancy allow signal on the multiple beams, or can select several beams according to the configuration of the base station to feed back the channel occupancy allow signal.

The base station determines the beam for accessing channel according to the channel occupancy allow signal fed back by multiple User Equipments (UEs). For example, the beam with the largest number of multiplexed users or the largest transmission capacity can be selected to access the channel for data transmission. Of course, there is no need to select if there is only one beam.

In an implementation, the fairness of the scheduling may also be considered, and the selection is based on the handshake success information on each beam or with reference to the information related to the user and data scheduling, such as the number of scheduling times, the size of the data to be transmitted, and the capability of the UE, etc.

Second Example

In this example and in an implementation, when the base station receives the channel occupancy allow signals on multiple beams, the base station schedules the user with successful handshake of the channel occupancy request signal and the channel occupancy allow signal for data transmission; and/or when the base station receives the channel occupancy allow signals on multiple beams, the base station performs the data transmission on the beams with the ratio between the number of user equipments that transmit channel occupancy allow signal on the beam and the number of user equipments that receive the channel occupancy request signal on the beam greater than a preset value.

In an implementation, among the beams with the ratio between the number of user equipments that transmits the channel occupancy allow signal and the number of user equipments that receive the channel occupancy request signal greater than the preset value, the beam that is dominant in the LBT time sequence is selected for data transmission.

Specifically, the base station often wants to schedule multiple user equipments at a time. The base station may transmit the channel occupancy request signals to multiple user equipments on the beams where the LBT succeeds. However, the user equipments of the base station that received the channel occupancy signals successfully may be a subset of the user equipments to which the base station transmits the request channel occupancy signals. After the base station receives the channel occupancy allow signals and accesses the channel, the base station only schedules the uplink or downlink data transmissions of the user equipments with successful handshake of the channel occupancy request signal/channel occupancy allow signal. Considering that there are multiple user equipments feeding back the channel occupancy allow signals, another optional operation method for the base station is to set a threshold. If the ratio between the number of UEs which transmits the channel occupancy allow signals on this beam and the number of UEs to which the base station transmits the channel occupancy request signals on this beam is less than the threshold, the base station is not allowed to access the channel on the beam. An example of the threshold may be set to 20%.

For example, the base station transmits the channel occupancy request signal on multiple beams. If the user equipment decodes the channel occupancy request signal correctly on multiple beams, the user equipment can feed back the channel occupancy allow signal based on the multiple beams, or can select several beams according to the configuration of the base station to feed back the channel occupancy allow signal. The base station determines the beam on % which it accesses the channel according to the channel occupancy allow signals fed back by multiple UEs, and may select the beam with the largest number of multiplexed user equipments or the largest transmission capacity to access the channel for data transmission. The other method is to access the channel preferentially on the beam that is dominant in the LBT time sequence on the basis that the ratio between the number of channel occupancy allow signals received on the beam and the number of channel occupancy request signals transmitted on the beam is less than the threshold described above.

Third Example

As in the first example, the better effect can be obtained under the condition of ensuring the consistency of the transmitting and receiving beams of the device. However, if the receiving beam performing the LBT and the beam transmitting the signal are not calibrated so that they cannot be kept to be the same beam, it is less significant to performing the LBT in the direction corresponding to the transmitting beam at this time, so the behavior of the base station may be to not perform the LBT in the direction corresponding to each beam, but to transmit the channel occupancy request signal directly in the direction corresponding to the allowed beam. At this time, other behaviors of the user equipment and the base station can be consistent with those in the first example.

Fourth Example

In this example, the followings are on the base station side.

The beam on which the LBT operation is performed is determined according to the prior information of the channel.

The prior information is whether the SSB can be transmitted correctly, or the transmission performance information of the beam obtained during the SSB transmission process.

Specifically, as in the first example, there are multiple beams for the base station to transmit the channel occupancy request signal. The base station may perform LBT in the directions corresponding to all possible beams, but this requires the relatively high degree of complexity. Therefore, the base station may determine a set of beams on which the LBT can be performed according to the prior information. A determining method is to use the prior information of the channel, for example, the base station may determine the beams that can transmit the SSB correctly as a set of beams that need to perform LBT; or may determine a certain best beam determined during the SSB transmission process as the beam that will perform LBT.

Fifth Example

In this example, the followings are on the base station side.

The step of performing the LBT operation includes one or a combination of:

performing the LBT continuously in the direction corresponding to a certain beam until the LBT succeeds; or performing the LBT in the direction corresponding to a certain beam in the preset time period, and if not successful, then switching to the direction corresponding to other beam to perform the LBT; or performing the LBT in the direction corresponding to each beam in a time-division mode based on the sequence of beam scanning.

The method may further include: the base station stops performing the LBT or continues performing the LBT after receiving the channel occupancy allow signal.

Specifically, the ways to perform LBT in the direction corresponding to a beam may be as follows.

The first way is to perform LBT in the direction corresponding to a certain beam continuously until the LBT succeeds.

The base station maintains a counter and performs the LBT in the direction corresponding to a beam until the LBT succeeds.

That is, in this way, the base station maintains a counter and will always perform LBT in a beam direction until the LBT succeeds.

The second way is to perform LBT in the direction corresponding to a certain beam, and switch to the direction corresponding to other beam to perform LBT if the time exceeds a certain threshold.

The base station maintains a counter and performs the LBT operation in the direction corresponding to a beam until the preset time period is exceeded, and if not successful, then switches to other counter, resets the value of the counter, and switches to the direction corresponding to other beam to perform the LBT.

That is, in this way, the base station maintains a counter, performs LBT in the direction corresponding to a beam, and when it has not accessed the channel after a first threshold is exceeded, the base station switches to another counter and resets the value of the counter.

The third way is to perform LBT in the direction corresponding to each beam in the time-division mode based on the sequence of beam scanning. The time granularity of the scanning is configurable, for example, it may be an integer multiple of the Clear Channel Assessment Slot (CCA slot) or an integer multiple of the OFDM symbol. The base station performs LBT in the direction corresponding to each beam, and then transmits a channel occupancy request signal on the beam where the LBT is successful.

The base station maintains multiple counters and performs the LBT in the direction corresponding to a beam until the preset time period is exceeded, and if not successful, then switches to other counter, retains the original counter value, and switches to the direction corresponding to other beam to perform the LBT.

Or, the base station maintains multiple counters and performs the LBT in the direction corresponding to a beam until the preset time period is exceeded, and if not successful, then switches to other counter, retains the original counter value but resets it until the times of exceeding the preset time period exceeds a preset value, and switches to the direction corresponding to other beam to perform the LBT.

That is, in this way, the base station maintains multiple counters, performs LBT in a beam direction, and switches to another counter when it has not accessed the channel after a threshold 1 is exceeded, where the original counter value continues to be retained. Or the value of the counter is reset only after a threshold 2 is exceeded.

In a fourth way, the base station maintains multiple counters, and performs the LBT in the direction corresponding to each beam in the time-division mode based on the sequence of beam scanning, wherein the time granularity of the scanning is configurable.

That is, in this way, the base station maintains multiple counters, and performs LBT in the direction corresponding to each beam in the time-division mode based on the sequence of beam scanning. The time granularity of the scanning is configurable, for example, it may be an integer multiple of the CCA slot or an integer multiple of the OFDM symbol. The base station performs LBT in the direction corresponding to each beam, and maintains the multiple counters according to the result of the LBT.

Once the channel occupancy allow signal transmitted by the user equipment is successfully received by the base station, the base station's behavior may be to abandon the continued execution of LBT in the directions corresponding to other beams, or continue to perform LBT in the directions corresponding to other beams, which depends on the implementation requirement.

Sixth Example

In this example, the followings are on the base station side.

The channel occupancy allow signal is fed back through the interlace information indicated dynamically by the base station; and/or the channel occupancy allow signal is fed back through the interlace information configured semi-statically by the network for the user equipment.

Correspondingly, the followings are on the user equipment side.

The channel occupancy allow signal is fed back through the interlace information indicated dynamically by the base station; and/or the channel occupancy allow signal is fed back through the interlace information configured semi-statically by the network for the user equipment.

Specifically, the channel occupancy allow signal is fed back according to the interlace information indicated by the base station.

Specifically, after receiving the channel occupancy request signal, the user equipment needs to feed back the channel occupancy allow signal to the base station.

The uplink transmission in unlicensed frequency band requires the transmission power to occupy more than 80% of the channel bandwidth, so the Licensed Assisted Access (LAA) adopts the interlace structure, that is, multiple Physical Resource Blocks (PRBs) are evenly distributed in the frequency domain as one interlace. For example, the full bandwidth is 100 PRBs, one PRB is occupied every 10 PRBs to obtain one interlace, and the full bandwidth supports 10 interlaces and supports up to 10 users. Therefore, the base station may configure the UE with the interlace information of transmission of the channel occupancy allow signal, that is, the transmitted channel occupancy request signal may include the interlace information (such as interlace index) allocated to the UE to feed back the channel occupancy allow signal. The indication in this way requires a certain amount of overhead.

Another possible method is: the network semi-statically configures an available interlace set for the UE, the user equipment freely selects the interlace for transmission, and at this time, the UEID information may be included in the channel occupancy allow signal.

Seventh Example

In this example, the followings are on the base station side.

The channel occupancy request signal feeds back the signal that allows the channel to be occupied through the time information configured by the base station for the user equipment; or the channel occupancy request signal is fed back by each user equipment at the same time.

The method may further include: the base station configures the LBT parameters required to feed back the channel occupancy allow signal for the user equipment.

When the LBT type in the LBT parameters is LBT cat.4, the LBT parameters include the size of the counter or the size information of the competition window for generating the counter.

Correspondingly, the followings are on the user equipment side.

The channel occupancy request signal feeds back the channel occupancy allow signal through the time information configured by the base station for the user equipment.

The method may further include:

receiving the LBT parameters required to feed back the channel occupancy allow signal, where the LBT parameters are configured by the base station for the user equipment:

feeding back the channel occupancy allow signal to the base station after performing LBT in the direction corresponding to the beam receiving the signal according to the LBT parameters.

When the LBT type in the LBT parameters is LBT cat.4, the LBT is performed according to the size of the counter or the size information of the competition window for generating the counter included in the LBT parameters.

Specifically, the frequency-domain transmission scheme of transmitting the channel occupancy allow signals by the multiple scheduled user equipments is given in the fifth example. For the time when the multiple scheduled user equipments transmit the channel occupancy allow signals, the following schemes are possible.

The multiple scheduled user equipments transmit the channel occupancy allow signals at the same time, and the base station can configure the user equipment with the LBT parameters required by the UE to transmit the channel occupancy allow signal. Then the channel occupancy request signal or the uplink scheduling signaling of the base station includes the LBT parameters (such as the LBT type) required by the UE to transmit the channel occupancy allow signal. If the LBT type is LBT cat.4, the size of the counter or the size information of the contention window for generating the counter may further be included.

Another scheme is to transmit the channel occupancy allow signals in a time division manner. For example, different UEs transmit the channel occupancy allow signals on different OFDM symbols. In this case, the base station can configure the time information on the feedback of the channel occupancy request signal for the user equipment. Then the channel occupancy request signal or the uplink scheduling signaling of the base station includes the time information on the feedback of the channel occupancy request signal.

Eighth Example

In this example, the transmission can generally be performed in only one beam direction in one time unit for transmissions of multiple beams, so the base station can transmit the channel occupancy request signals to the user equipment sequentially on at least one beam.

In an implementation, when performing LBT in multiple beam directions, the beam direction that allows the channel occupancy request signal to be transmitted is firstly determined when the channel occupancy request signal is transmitted. An example of the determining method is for example the carrier that is the first to perform LBT successfully. At this time, not all beam directions mentioned above are in the LBT stage, the LBT has succeeded in some beam directions, and there are other beam directions in which the LBT has not succeeded. The base station transmits the channel occupancy request signal in the previously determined beam direction. If the handshake time of the channel occupancy request signal/the channel occupancy allow signal is not significantly greater than the time to scan the next beam, and if the LBT is firstly performed in the other beam direction at this time, the transmission/reception conversion cannot be completed (Tx/Rx conversion radio frequency needs some time), so that the channel occupancy allow signal is received in the direction of the beam transmitting the channel occupancy request signal. But, if the time mentioned above is long enough, the base station can be allowed to perform LBT in other beam direction, and then return to the beam direction that originally transmits the channel occupancy request signal to receive the channel occupancy allow signal in the corresponding time window. Thus there are two schemes when the multi-beam LBT is allowed.

Therefore, there are at least two schemes when the LBT in the directions corresponding to multiple beams is allowed.

Scheme 1: after the base station transmits the channel occupancy request signal to the user equipment on a beam, the base station waits for receiving the channel occupancy allow signal on the beam, that is, waits for receiving the channel occupancy allow signal in the beam direction after transmitting the channel occupancy request signal.

Scheme 2: after the base station transmits the channel occupancy request signal to the user equipment on a beam, the base station continues to transmit the channel occupancy request signal to the UE on a next beam, and receives the corresponding channel occupancy allow signal on the beam that has transmitted the channel occupancy request signal, that is, continues scanning on other beams after transmitting the channel occupancy request signal.

Of course, the beam performing LBT in the above corresponds to only one direction, so only the scheme 1 can be used.

Ninth Example

In this example, the followings are on the base station side.

The channel occupancy request signal is transmitted using subcarriers of 60K and above.

Correspondingly, the followings are on the user equipment side.

The channel occupancy request signal is transmitted using subcarriers of 60K and above.

In an implementation, the gap between the handshake signals, i.e., the channel occupancy request signal and the channel occupancy allow signal, is an integer multiple of the OFDM symbol during implementation.

In an implementation, when the channel occupancy request signal is transmitted using subcarriers of 60K, the gap between the channel occupancy request signal and the channel occupancy allow signal is 1 OFDM symbol, or when the channel occupancy request signal is transmitted using subcarriers of 120K, the gap between the channel occupancy request signal and the channel occupancy allow signal is 2-3 OFDM symbols; or when the channel occupancy request signal is transmitted using subcarriers of 240K, the gap between the channel occupancy request signal and the channel occupancy allow signal is 4-6 OFDM symbols; or when the channel occupancy request signal is transmitted using subcarriers of 480K, the gap between the channel occupancy request signal and the channel occupancy allow signal is 8-12 OFDM symbols.

In an implementation, the gap value is notified by the base station to the user equipment through signaling, or pre-agreed by the network and the user equipment.

Specifically, the base station does not confirm the acquisition of the channel occupancy right after transmitting the channel occupancy request signal. In order to prevent the channel from being snatched by other systems, the user equipment may directly transmit a channel occupancy allow signal without using LBT. It is stipulated in ETSI that the short control signaling may have no need to sense the channel. For example, the gap between the RTS frame and the CTS frame of WiFi is 16 us, and the CTS does not need to listen. The NR supports flexible baseband parameters (numerology), specifically as shown in the following table.

| Subcarrier spacing | 15K | 30K | 60K | 120K | 240 | 480 |
|---|---|---|---|---|---|---|
| OFDM symbol length | 66.67 us | 33.3 us | 16.67 us | 8.33 us | 4.17 us | 2.08 us |
| Cyclic prefix | 4.8 us | 2.4 us | 1.2 us | 0.6 us | 0.3 us | 0.15 us |

Therefore, in order to ensure that the channel occupancy allow signal does not need to perform LBT, the channel occupancy request signal/the channel occupancy allow signal can be transmitted using subcarriers of 60K and above. For the data transmission subcarriers, the corresponding subcarrier size may be used as required according to the adopted frequency band. In the case when the subcarrier spacing is greater than or equal to 60K, in order to avoid the channel occupancy allow signal from performing the LBT operation and to reserve time for the user equipment to decode the channel occupancy request signal, for the subcarrier spacing of 60K, the gap between the channel occupancy request signal and the channel occupancy allow signal is 1 OFDM symbol; for the subcarrier spacing of 120K, the gap between the channel occupancy request signal and the channel occupancy allow signal is 2-3 OFDM symbols; for the subcarrier spacing of 240K, the gap between the channel occupancy request signal and the channel occupancy allow signal is 4-6 OFDM symbols; and for the subcarrier spacing of 480K, the gap between the channel occupancy request signal and the channel occupancy allow signal is 8-12 OFDM symbols.

After the implementations related to the channel occupancy request signal are illustrated, the implementations of the solutions of transmitting and receiving the channel occupancy request signal will be illustrated below.

Figure 4:
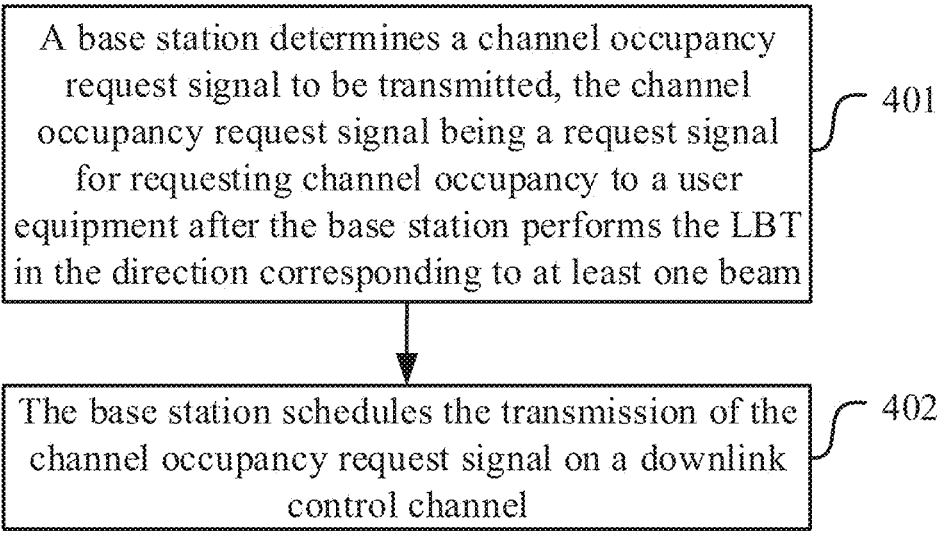
FIG. 4 is a schematic diagram of a method for transmitting a request signal on the base station side according to an embodiment of the invention.

FIG. 4 is a schematic diagram of a method for transmitting a request signal on the base station side. As shown, the method may include the following steps.

Step 401: a base station determines a channel occupancy request signal to be transmitted, wherein the channel occupancy request signal is a request signal for requesting channel occupancy to a user equipment after the base station performs the LBT in the direction corresponding to at least one beam.

Step 402: the base station schedules the transmission of the channel occupancy request signal on a downlink control channel.

Specifically, the channel occupancy request signal scheduled by a downlink control channel (for example. Physical Downlink Control Channel (PDCCH)) may be transmitted.

The downlink control channel may be scrambled by the Radio Network Temporary Identity (RNTI) dedicated to the channel occupancy request signal.

The control information scheduled by the PDCCH may include the frequency-domain information and time-domain information of the transmission of the fed-back channel occupancy allow signal, information of beam on which the LBT is successful, and the 1-bit indication information of the channel occupancy request signal; and it may further include the LBT-related information used by the fed-back channel occupancy allow signal.

The RNTI dedicated to the channel occupancy request signal is associated with the Tracking Area (TA) ID or Wake Up Signal (WUS) area ID.

It is also possible to limit the number of PDCCH candidates in the PDCCH search space to a fixed value.

A UE specific sequence is transmitted or a cell specific sequence occupying the full bandwidth is transmitted before the downlink control channel (such as PDCCH) scrambled based on the RNTI of the channel occupancy request signal.

Figure 5:
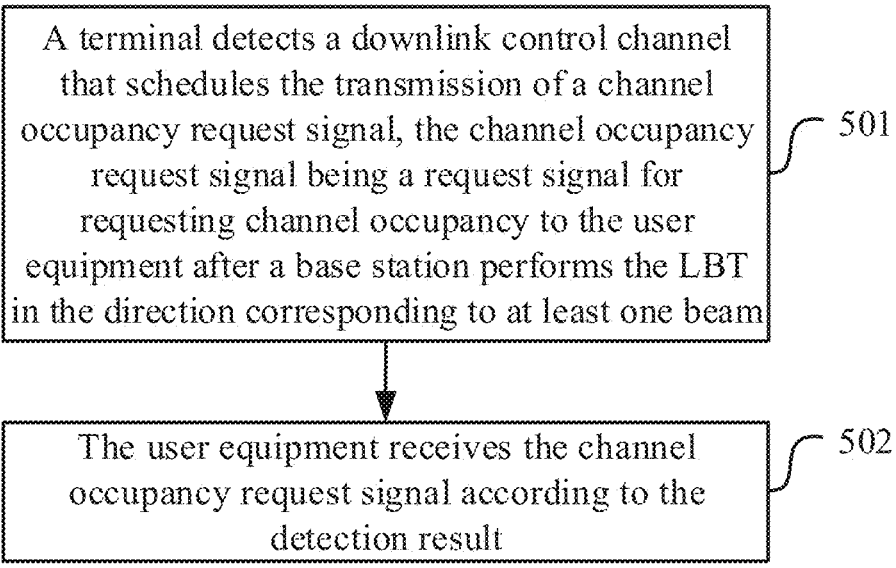
FIG. 5 is a schematic diagram of a method for receiving a request signal on the user equipment side.

FIG. 5 is a schematic diagram of a method for receiving a request signal on the user equipment side. As shown, the method may include the following steps.

Step 501: a user equipment detects a downlink control channel that schedules the transmission of a channel occupancy request signal, the channel occupancy request signal is a request signal for requesting channel occupancy to the user equipment after a base station performs the LBT in the direction corresponding to at least one beam.

Step 502: the user equipment receives the channel occupancy request signal according to the detection result.

Specifically, on the user equipment side, the user equipment detects the downlink control channel (such as PDCCH) scrambled by the RNTI dedicated to the channel occupancy request signal.

The user equipment detects the PDCCH according to the search space configured statically or semi-statically.

The user equipment detects the UE specific or cell specific preamble sequence before detecting the downlink control channel.

Since the transmission and reception are the corresponding processes, the implementations will focus on the implementations on one side. Those skilled in the art can know the implementations on the corresponding side according to the corresponding processing, which will not be repeated in the embodiments.

Specific description will be given below in combination with embodiments.

First Embodiment

In an implementation, during the scheduling on the downlink control channel, corresponding control information on the downlink control channel is scrambled by an RNTI dedicated to the channel occupancy request signal.

In an implementation, the dedicated RNTI is associated with a TA ID or WUS area ID.

In an implementation, the control information may include one or a combination of: information of beam on which LBT is successful, 1-bit indication information of the channel occupancy request signal, and information related to a channel occupancy allow signal fed back by the user equipment.

In an implementation, the information related to the channel occupancy allow signal fed back by the user equipment may include one or a combination of: frequency-domain information of the fed-back channel occupancy allow signal, time-domain information of the fed-back channel occupancy allow signal, LBT-related information used by the fed-back channel occupancy allow signal, and interlace information of transmission of the fed-back channel occupancy allow signal allocated to a UE.

That is, the Downlink Control Information (DCI) may include some or all of the following fields: the beam information (such as beam ID) used when transmitting the channel occupancy request signal, or the 1-bit indication information of the channel occupancy request signal; the information related to the channel occupancy allow signal fed back by the user equipment, such as the LBT mechanism used by the fed-back channel occupancy allow signal; the information related to the transmission resources of the fed-back channel occupancy allow signal.

Specifically, the base station uses the PDCCH to schedule the transmission of the channel occupancy request signal, and the PDCCH uses the Radio network Temporary Identifier (RNTI) dedicated to the channel occupancy request signal for scrambling. The so-called scrambling may be implemented in at least the following ways:

performing the XOR operation on the RNTI dedicated to the request signal and the Cyclic Redundancy Check (CRC) bit of the PDCCH;

or performing the XOR operation on the RNTI dedicated to the request signal and the CRC bit of the PDCCH and the frozen bit of the polar code. The PDCCH may include the beam information (such as beam ID) used when transmitting the channel occupancy request signal, or the 1-bit indication information of the channel occupancy request signal; the information related to the channel occupancy allow signal fed back by the user equipment, such as the LBT mechanism used by the fed-back channel occupancy allow signal.

In order to support the paging of UEs in the RRC-idle mode, the network configures Tracking Areas (TAs), where each TA includes multiple base stations, and the identifier of the TA is TA ID. The TA may include many base stations, and a large number of UEs may be included in the range of the TA. This brings great difficulties to the design of the Wake Up Signal (WUS) for UEs. Therefore, it is considered to divide one tracking area into multiple wake up areas in the prior art. Then, the RNTI dedicated to the request signal may also be associated with the TA ID or WUS area ID, for example, it may be a modular operation between the TA ID or WUS ID and the cell sequence number.

The uplink transmission of unlicensed frequency band requires the transmission power to occupy more than 80% of the channel bandwidth, so the Licensed Assisted Access (LAA) adopts the interlace structure, that is, multiple Physical Resource Blocks (PRBs) are evenly distributed in the frequency domain as one interlace. For example, the full bandwidth is 100 PRBs, one PRB is occupied every 10 PRBs to obtain one interlace, and the full bandwidth supports 10 interlaces and supports up to 10 users. Therefore, the base station needs to configure the User Equipment (UE) with the information related to the transmission resources of the signal that allows the channel to be occupied, such as the interlace information of transmission. Further, the PDCCH scheduling the channel occupancy request signal should include the interlace information (such as interlace index) allocated to the UE to feed back the transmission of the channel occupancy allow signal.

The control information transmitted on the PDCCH may further include the information of beam on which the LBT is successful, which is helpful to assist other nodes in judging the magnitude of interference; and the information in the PDCCH includes the information on the time gap between the channel occupancy request signal and the time when the UE feeds back the channel occupancy allow signal. For example, the base station can configure different UEs to feed back the channel occupancy allow signals on different or same OFDM symbols. Of course, this gap information may be carried in the PDCCH or in the channel occupancy request signal, or may be notified by the base station to the UE through semi-static signaling. The PDCCH may further include the 1-bit indication information of the channel occupancy request signal; and it may further include the LBT-related information used by the fed-back channel occupancy allow signal, such as the LBT type, and the size of a counter used for random back-off.

Second Embodiment

In this embodiment, the followings are on the user equipment side.

The user equipment detects the downlink control channel that schedules the transmission of the channel occupancy request signal according to the statically or semi-statically configured search space.

When the downlink control channel is a PDCCH, the number of PDCCH candidates in the PDCCH search space of the detected PDCCH is a fixed value.

At the base station side.

When the downlink control channel is a PDCCH, the number of PDCCH candidates in the PDCCH search space of the PDCCH transmitting the control information is a fixed value.

Specifically, the base station statically or semi-statically configures the transmission resources of the PDCCH information scrambled by the RNTI dedicated to the channel occupancy request signal for the user equipment, for example, may configure the search space carrying the PDCCH as a common search space, and also configure the aggregation level corresponding to the PDCCH. For example, the aggregation level is configured as the allowed highest value, such as type 2 PDCCH. When the aggregation level of the common search space is 16, the number of PDCCH candidates is 1. Therefore, the base station configures the number of PDCCH candidates in the search space corresponding to the control channel of the channel occupancy request signal as 1, so that the user equipment blindly detects the PDCCH on the designated resources according to the semi-static configuration of the base station. Since the resources are greatly limited, the number of blind detections of the PDCCH corresponding to the channel occupancy request signal will be reduced sharply, thereby greatly reducing the power consumption.

Third Embodiment

In this embodiment, the followings are on the base station side.

The method may further include: transmitting a UE specific sequence before transmitting the control information scrambled by the RNTI.

In an implementation, the UE specific sequence is a UE specific reference signal, or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with that of the DMRS signal; or the reference signal is a repetition of the DMRS signal in time and frequency domains; or the reference signal reuses the DMRS signal.

In an implementation, the UE specific sequence is a part of the WUS signal, which means that the UE specific sequence is a subset corresponding to the RRC_Connected in the WUS sequence.

In an implementation, the method further includes one or a combination of the following processes of mapping the UE specific sequence in frequency domain: the frequency-domain transmission resources of the UE specific sequence is a function of the PDCCH frequency-domain transmission resources corresponding to the UE; or the UE specific 27, sequence occupies the full bandwidth for transmission; or the UE specific sequence is transmitted in the interlace manner.

Correspondingly, the followings are on the user equipment side.

The method may further include: detecting a UE specific sequence before detecting the control information scrambled by the RNTI.

In an implementation, the UE specific sequence is a UE specific reference signal, or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with the pattern of the DMRS signal; or the reference signal is a repetition of the DMRS signal in time and frequency domains; or the reference signal reuses the DMRS signal.

In an implementation, the UE specific sequence is a part of the WUS signal, which means that the UE specific sequence is a subset corresponding to the RRC_Connected in the WUS sequence.

In an implementation, the method further includes one or a combination of the following processes of mapping the UE specific sequence in frequency domain: the frequency-domain transmission resources of the UE specific sequence is a function of the PDCCH frequency-domain transmission resources corresponding to the UE; or the UE specific sequence occupies the full bandwidth for transmission; or the UE specific sequence is transmitted in the interlace manner.

Specifically, as in the second embodiment, although the number of search space PDCCH candidates corresponding to the control signaling is set as 1, the user equipment still needs to use the complicated list decoding algorithm to decode because the control channel adopts the polar coding. In order to avoid the complicated decoding and reduce the power consumption, the base station transmits a UE specific sequence before the channel occupancy request signal, where the sequence may have two schemes as follows.

Scheme 1: the UE specific sequence is a UE specific Reference Signal (RS), which may be a function of the DMRS signal of the PDCCH corresponding to the channel occupancy request signal, that is, the DMRS sequence is used as one of the input values to obtain the UE specific sequence, for example.

Alt.1: the DMRS signal of the PDCCH with increased power.

That is, the pattern is consistent with that of the Dedicate DeModulation Reference Signal (DMRS) used for the subsequent transmission of the PDCCH. However, since the transmission power of the unlicensed spectrum is fixed, the power can be increased on these DMRSs. One purpose is to reduce the probability of false detection, and the other is to prevent other systems from preempting the channel.

Alt.2: the repetition of the DMRS signal of the PDCCH in time and frequency domains.

Alt.3: directly reuse the DMRS signal of the PDCCH for detection.

Figure 6:
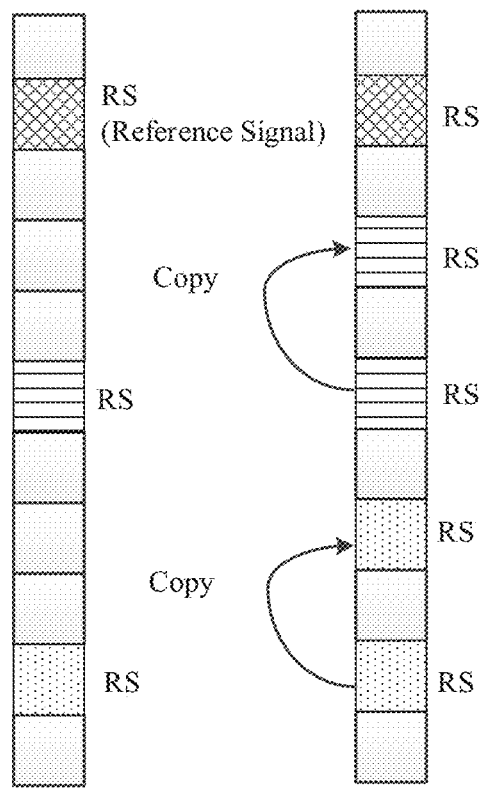
FIG. 6 is a schematic diagram of generating the UE specific RS according to an embodiment of the invention.

FIG. 6 is a schematic diagram of generating the UE specific RS. As shown in FIG. 6, the left side of the figure is an example in which the DMRS pattern of the PDCCH in the NR uses the above Alt.2 in one Orthogonal Frequency Division Multiplex (OFDM) symbol. The specific value of the DMRS signal is a UE specific sequence. This DMRS pattern is copied to obtain the DMRS pattern shown on the right side of the figure. Obviously, the DMRS density on the right side of the figure is much denser than the original DMRS; and in fact, the PDCCH may be multiple OFDM symbols, and it is also possible to copy all or some of the DMRSs in the multiple OFDM symbols. For example, the copy between subcarriers with the same frequency domain gets the new pilot signals much denser than the original DMRSs of the PDCCH. This is the repetition process of the DMRS signal of the PDCCH in the time and frequency domains.

The aforementioned UE specific dense DMRS sequence can occupy one OFDM symbol. Of course, the occupancy of multiple OFDM symbols is not excluded. If there are multiple OFDM symbols, the generation method thereof is similar. If the density of the DMRS is not increased and if it is located before the PDCCH, there is preferably a need to increase the power of the DMRS. If the DMRS is not independent of the transmission of the PDCCH, the original DMRS design can be reused. Regardless of which function of the DMRS is used to obtain the sequence, the UE's detection process can be as follows: the UE blindly detects the sequence at first, and starts detecting the channel occupancy request signal only when the sequence has been detected.

The advantage of this scheme is that it enables the UE to detect UE specific reference signal to avoid the direct detection of the PDCCH, thereby avoiding the polar decoding and achieving power saving. At the same time, another advantage is that the UE specific reference signal sent previously can be reused when the PDCCH is decoded later to improve the channel estimation accuracy of the PDCCH. It can be sent before or after the PDCCH.

Scheme 2: the UE specific sequence is a part of the WUS signal.

At present, in the research of Narrow Band Internet of Things (NB-IoT) power consumption, it is considered to additionally transmit a Wake Up Signal (WUS) to trigger the paging signal detection, where the WUS signal is specific to the UE. Since the WUS is also a sequence, it may be considered to use the WUS to identify whether there is a signal of its own. The NR WUS design needs to consider three states: idle-state RRC (RRC_IDLE), active-state RRC (RRC_Inactive) and connected-state RRC (RRC_Connected). In an implementation, a subset corresponding to RRC_Connected in the WUS sequence may be transmitted before the PDCCH.

In this way, the UE determines whether the PDCCH is coming by blindly detecting the subset of the WUS.

The frequency-domain mapping mode of the UE specific sequence may be as follows.

1) The frequency-domain transmission resources of the UE specific sequence is a function of the PDCCH frequency-domain transmission resources corresponding to the UE, for example, the frequency domain of the WUS subset of the UE occupies all the subcarriers for the UE to transmit the PDCCH and its corresponding pilot.

2) The sequence occupies the full bandwidth for transmission, for example, the sequence is an orthogonal sequence.

3) Similar to the uplink transmission of Licensed Assisted Access (LAA), the UE specific sequence is transmitted in the interlace way; and unlike the LAA, the frequency-domain granularity of each interlace may not be PRB, for example, the number of subcarriers is less than 12.

Fourth Embodiment

In an implementation, on the base station side, the method may further include:

scrambling the corresponding control information on the downlink control channel during the scheduling on the downlink control channel:

transmitting a cell specific sequence before transmitting the scrambled control information.

The scrambling may be performed by using the RNTI dedicated to the channel occupancy request signal or using the UE ID.

Correspondingly, on the user equipment side, the method may further include:

detecting a cell specific sequence before detecting the scrambled control information.

In the third embodiment, a UE specific sequence is detected before the channel occupancy request signal is detected, which will significantly reduce the UE power consumption. However, since this sequence is specific to the UE, other unscheduled UEs or other base stations cannot receive the channel occupancy request signal and thus cannot know the transmission frequency-domain resources of the channel occupancy allow signal fed back by the UE.

Therefore, another alternative solution is: the base station transmits a cell specific sequence before the channel occupancy request signal, where the sequence occupies the full bandwidth; and all the UEs in the cell detect this cell specific sequence and start detecting the PDCCH once this sequence is detected. In order to reduce the power consumption, the solution of the second embodiment can be used to limit the PDCCH aggregation level or set the number of PDCCH candidates to a fixed value, such as 1.

It should be noted that when the sequence is specific to cell, the way to scramble the PDCCH does not exclude other scrambling ways in addition to the RNTI dedicated to the channel occupancy request signal.

It should be noted that the time-domain position relationship between the above UE specific sequence or cell specific sequence and the PDCCH corresponding to the channel occupancy request signal is preferably that the sequence is located before the PDCCH or is frequency-division multiplexed with the PDCCH. The special case where the sequence is located after the PDCCH is not excluded, but the UE starts detecting the channel occupancy request signal only after detecting the sequence.

Based on the same inventive concept, the embodiments of the invention further provide a base station, a user equipment, and apparatuses for transmitting and receiving the request signal. Since the principles solving the problem of these devices are similar to those of the methods for transmitting and receiving the request signal, the implementations of these devices may refer to the implementations of the methods, and the repeated description thereof will be omitted here.

When the technical solution according to the embodiments of the invention is implemented, it may be implemented in such way as follows.

Figure 7:
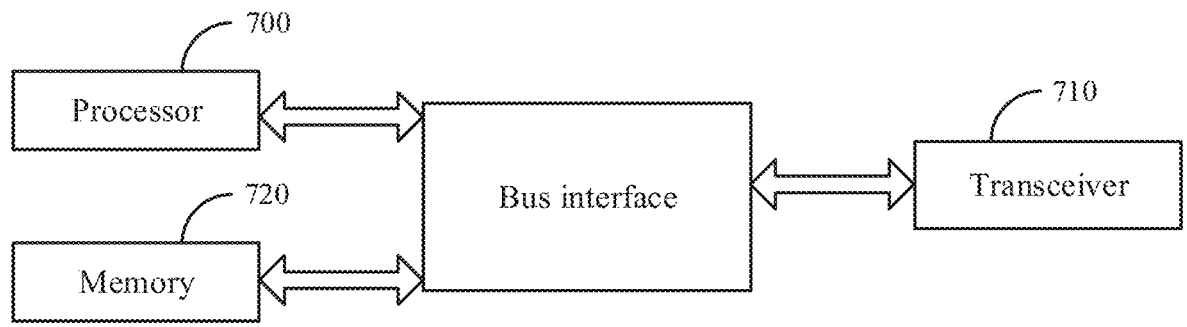
FIG. 7 is a schematic structural diagram of a base station according to an embodiment of the invention.

FIG. 7 is a schematic structural diagram of a base station. As shown, the base station includes:

a processor 700 configured to read the programs in a memory 720 to perform the process of:

determining a channel occupancy request signal to be transmitted, wherein the channel occupancy request signal is a request signal for requesting channel occupancy to a user equipment after the base station performs the LBT in the direction corresponding to at least one beam;

a transceiver 710 configured to receive and transmit the data under the control of the processor 700 to perform the process of:

scheduling the transmission of the channel occupancy request signal on a downlink control channel.

In an implementation, during the scheduling on the downlink control channel, control information on the downlink control channel is scrambled by an RNTI dedicated to the channel occupancy request signal.

In an implementation, the RNTI is associated with a TA ID or WUS area ID.

In an implementation, the process further includes: transmitting a UE specific sequence or a cell specific sequence before transmitting the control information scrambled by the RNTI.

In an implementation, the UE specific sequence is a UE specific reference signal, or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with the pattern of the DMRS signal; or the reference signal is a repetition of the DMRS signal in time and frequency domains; or the reference signal reuses the DMRS signal.

In an implementation, the process further includes one or a combination of the following processes of mapping the UE specific sequence in frequency domain:

the frequency-domain transmission resources of the UE specific sequence is a function of the PDCCH frequency-domain transmission resources corresponding to the UE; or the UE specific sequence occupies the full bandwidth for transmission; or the UE specific sequence is transmitted in the interlace manner.

In an implementation, the process further includes:

scrambling the corresponding control information on the downlink control channel during the scheduling on the downlink control channel;

transmitting a cell specific sequence before transmitting the scrambled control information.

In an implementation, the downlink control channel is a PDCCH;

the number of PDCCH candidates in a PDCCH search space of the PDCCH transmitting the control information is a fixed value.

In an implementation, the control information includes one or a combination of:

information of beam on which LBT is successful, 1-bit indication information of the channel occupancy request signal, and information related to a channel occupancy allow signal fed back by the user equipment.

In an implementation, the information related to the channel occupancy allow signal fed back by the user equipment includes one or a combination of:

frequency-domain information of the fed-back channel occupancy allow signal, time-domain information of the fed-back channel occupancy allow signal, LBT-related information used by the fed-back channel occupancy allow signal, and interlace information, allocated to the UE, of transmission of the fed-back channel occupancy allow signal.

In FIG. 7, the bus architecture can include any numbers of interconnected buses and bridges, and specifically link various circuits of one or more processors represented by the processor 700 and the memory represented by the memory 720. The bus architecture may further link various other circuits such as peripheral device, voltage regulator and power management circuit, which are all well known in the art and thus will not be further described again herein. The bus interface provides an interface. The transceiver 710 may be a plurality of elements, i.e., include a transmitter and a receiver, and provide the units for communicating with various other devices over the transmission media. The processor 700 is responsible for managing the bus architecture and general processing, and the memory 720 can store the data used by the processor 700 when performing the operations.

Figure 8:
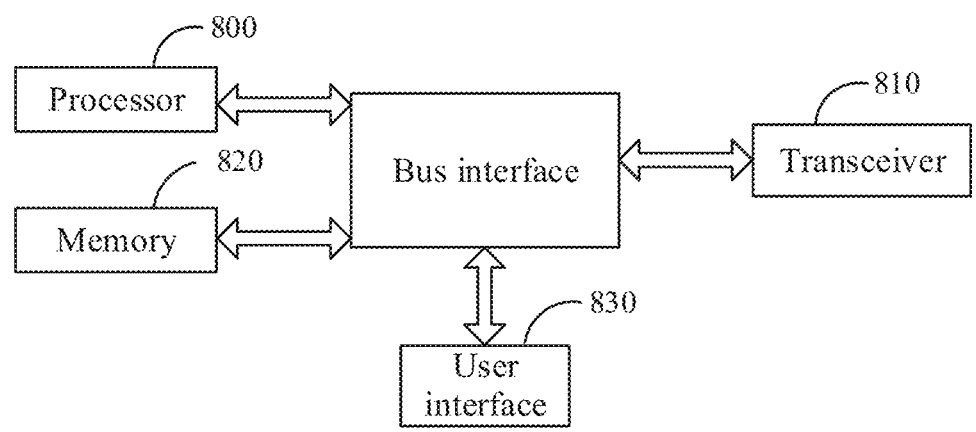
FIG. 8 is a schematic structural diagram of a UE according to an embodiment of the invention.

FIG. 8 is a schematic structural diagram of a UE. As shown, the user equipment includes:

a processor 800 configured to read the programs in a memory 820 to perform the process of:

detecting a downlink control channel that schedules transmission of a channel occupancy request signal, wherein the channel occupancy request signal is a request signal for requesting channel occupancy to a user equipment after a base station performs the LBT in the direction corresponding to at least one beam;

a transceiver 810 configured to receive and transmit the data under the control of the processor 800 to perform the process of:

receiving the channel occupancy request signal according to a detection result.

In an implementation, during the scheduling on the downlink control channel, control information on the downlink control channel is scrambled by an RNTI dedicated to the channel occupancy request signal.

In an implementation, the RNTI is associated with a TA ID or WUS area ID.

In an implementation, the process further includes:

detecting a UE specific sequence or a cell specific sequence before detecting the control information scrambled by the RNTI.

In an implementation, the UE specific sequence is a UE specific reference signal; or the UE specific sequence is a part of a WUS signal.

In an implementation, the reference signal is a function of a DMRS signal adopted on a PDCCH corresponding to a channel transmitting the channel occupancy request signal.

In an implementation, the reference signal is a function of the DMRS signal, which means that the pattern of the reference signal is consistent with the pattern of the DMRS signal; or the reference signal is a repetition of the DMRS signal in time and frequency domains; or the reference signal reuses the DMRS signal.

In an implementation, the process further includes one or a combination of the following processes of mapping the UE specific sequence in frequency domain:

the frequency-domain transmission resources of the UE specific sequence is a function of the PDCCH frequency-domain transmission resources corresponding to the UE; or the UE specific sequence occupies the full bandwidth for transmission; or the UE specific sequence is transmitted in the interlace manner.

In an implementation, the process further includes: detecting a cell specific sequence before detecting the scrambled control information.

In an implementation, the downlink control channel that schedules the transmission of the channel occupancy request signal is detected according to a statically or semi-statically configured search space.

In an implementation, the downlink control channel is a PDCCH; the number of PDCCH candidates in a PDCCH search space of the detected PDCCH is a fixed value.

In an implementation, the control information includes one or a combination of:

information of beam on which LBT is successful, 1-bit indication information of the channel occupancy request signal, and information related to a channel occupancy allow signal fed back by the user equipment.

In an implementation, the information related to the channel occupancy allow signal fed back by the user equipment includes one or a combination of:

frequency-domain information of the fed-back channel occupancy allow signal, time-domain information of the fed-back channel occupancy allow signal, LBT-related information used by the fed-back channel occupancy allow signal, and interlace information, allocated to the UE, of transmission of the fed-back channel occupancy allow signal.

In FIG. 8, the bus architecture may include any numbers of interconnected buses and bridges, and specifically link various circuits of one or more processors represented by the processor 800 and the memory represented by the memory 820. The bus architecture may further link various other circuits such as peripheral device, voltage regulator and power management circuit, which are all well known in the art and thus will not be further described again herein. The bus interface provides an interface. The transceiver 810 may be a plurality of elements, i.e., include a transmitter and a receiver, and provide the units for communicating with various other devices over the transmission media. For different user equipments, the user interface 830 may also be an interface capable of inter-connecting or exter-connecting with the required devices, and the connected devices include but not limited to keypad, display, loudspeaker, microphone, joystick and the like.

The processor 800 is responsible for managing the bus architecture and general processing, and the memory 820 may store the data used by the processor 800 when performing the operations.

An embodiment of the invention further provides an apparatus for transmitting a request signal, including:

a determining module configured to determine a channel occupancy request signal to be transmitted, wherein the channel occupancy request signal is a request signal for requesting channel occupancy to a user equipment after a base station performs the LBT in the direction corresponding to at least one beam;

a transmission module configured to schedule transmission of the channel occupancy request signal on a downlink control channel.

For details, refer to the implementations of the method for transmitting the request signal and the base station.

An embodiment of the invention further provides an apparatus for receiving a request signal, including:

a detection module configured to detect a downlink control channel that schedules transmission of a channel occupancy request signal, wherein the channel occupancy request signal is a request signal for requesting channel occupancy to a user equipment after a base station performs the LBT in the direction corresponding to at least one beam;

a receiving module configured to receive the channel occupancy request signal according to a detection result.

For details, refer to the implementations of the method for receiving the request signal and the UE.

For the sake of description, all the parts of the above-mentioned device are divided into various modules or units by function, which are described respectively. Of course, the functions of the various modules or units may be implemented in the same one or more software or hardware when the invention is implemented.

In summary, the scheme provided in the technical solutions according to the embodiments of the invention includes: transmitting the channel occupancy request signal scheduled by the PDCCH based on the RNTI dedicated to the channel occupancy request signal.

The DIC includes some or all of the following fields: the beam information (such as beam ID) used when transmitting the channel occupancy request signal, or the 1-bit indication information of the channel occupancy request signal; the information related to the channel occupancy allow signal fed back by the user equipment, such as the LBT mechanism used by the fed-back channel occupancy allow signal, the information related to the transmission resources of the fed-back channel occupancy allow signal.

The number of PDCCH candidates in the PDCCH search space is limited to 1.

The UE specific sequence is transmitted before the PDCCH:

a) DMRS enhancement, wherein the DMRS is a function of the DMRS corresponding to the PDCCH;

b) WUS subset, of which the RE mapping is a function of transmission frequency-domain resources corresponding to the UE PDCCH.

The defect of no such design in the prior art has been overcome, and at the same time, the above technical solution can realize the transmission of the channel occupancy request signal of the eNB and can achieve the lowest power consumption.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, CD-ROMs, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the preferred embodiments of the invention have been described, those skilled in the art can make additional alterations and modifications to these embodiments once they learn about the basic creative concepts. Thus the attached claims are intended to be interpreted to include the preferred embodiments as well as all the alterations and modifications falling within the scope of the invention.

Evidently those skilled in the art can make various modifications and variations to the embodiments of the invention without departing from the spirit and scope of the embodiments of the invention. Thus the invention is also intended to encompass these modifications and variations therein as long as these modifications and variations to the embodiments of the invention come into the scope of the claims of the invention and their equivalents.

What is claimed is:

1. A method for transmitting a request signal, comprising:
determining, by a base station, a channel occupancy request signal to be transmitted, wherein the channel occupancy request signal is a request signal for requesting channel occupancy to a user equipment after the base station performs a Listen-Before-Talk (LBT) in a direction corresponding to at least one beam;
scheduling, by the base station, transmission of the channel occupancy request signal on a downlink control channel;
wherein during the scheduling on the downlink control channel, control information on the downlink control channel is scrambled by a Radio Network Temporary Identifier (RNTI) dedicated to the channel occupancy request signal; and
transmitting a User Equipment (UE) specific sequence or a cell specific sequence before transmitting the control information scrambled by the RNTI; wherein the UE specific sequence is a UE specific reference signal; or the UE specific sequence is a part of a Wake-up Signal (WUS); wherein the UE specific sequence is a part of the WUS, comprising: the UE specific sequence is a subset corresponding to a Radio Resource Control (RRC) in a connected-state in a WUS sequence.

2. The method of claim 1, wherein the UE specific reference signal is a function of a Demodulation Reference Signal (DMRS) adopted on a Physical Downlink Control Channel (PDCCH) corresponding to a channel transmitting the channel occupancy request signal;
wherein the UE specific reference signal is a function of the DMRS, comprising: a pattern of the UE specific reference signal is consistent with a pattern of the DMRS; or the UE specific reference signal is a repetition of the DMRS in time and frequency domains; or the UE specific reference signal reuses the DMRS.

3. The method of claim 1, further comprising one or a combination of following processes of mapping the UE specific sequence in frequency domain:
frequency-domain transmission resources of the UE specific sequence is a function of Physical Downlink Control Channel (PDCCH) frequency-domain transmission resources corresponding to the user equipment; or
the UE specific sequence occupies a full bandwidth for transmission; or
the UE specific sequence is transmitted in an interlace manner.

4. The method of claim 1, wherein the downlink control channel is a Physical Downlink Control Channel (PDCCH);
the number of PDCCH candidates in a PDCCH search space of the PDCCH transmitting control information is a fixed value.

5. The method of claim 1, wherein the control information comprises one or a combination of:
information of beam on which LBT is successful, 1-bit indication information of the channel occupancy request signal, and information related to a channel occupancy allow signal fed back by the user equipment.

6. The method of claim 5, wherein the information related to the channel occupancy allow signal fed back by the user equipment comprises one or a combination of:
frequency-domain information of the fed-back channel occupancy allow signal, time-domain information of the fed-back channel occupancy allow signal, LBT-related information used by the fed-back channel occupancy allow signal, and interlace information, allocated to the user equipment, of transmission of the fed-back channel occupancy allow signal.

7. A method for receiving a request signal, comprising:
detecting, by a user equipment, a downlink control channel that schedules transmission of a channel occupancy request signal, wherein the channel occupancy request signal is a request signal for requesting channel occupancy to the user equipment after a base station performs a Listen-Before-Talk (LBT) in a direction corresponding to at least one beam;
receiving, by the user equipment, the channel occupancy request signal according to a detection result;
wherein during the scheduling on the downlink control channel, control information on the downlink control channel is scrambled by a Radio Network Temporary Identifier (RNTI) dedicated to the channel occupancy request signal;
detecting a User Equipment (UE) specific sequence or a cell specific sequence before detecting the control information scrambled by the RNTI; wherein the UE specific sequence is a UE specific reference signal; or the UE specific sequence is a part of a WUS signal; wherein the UE specific sequence is a part of the WUS, comprising: the UE specific sequence is a subset corresponding to a Radio Resource Control (RRC) in a connected-state in a WUS sequence.

8. The method of claim 7, wherein the UE specific reference signal is a function of Demodulation Reference Signal (DMRS) adopted on a Physical Downlink Control Channel (PDCCH) corresponding to a channel transmitting the channel occupancy request signal;
wherein the UE specific reference signal is a function of the DMRS, comprising: a pattern of the UE specific reference signal is consistent with a pattern of the DMRS; or the UE specific reference signal is a repetition of the DMRS in time and frequency domains; or the UE specific reference signal reuses the DMRS.

9. The method of claim 7, further comprising one or a combination of following processes of mapping the UE specific sequence in frequency domain:
frequency-domain transmission resources of the UE specific sequence is a function of Physical Downlink Control Channel (PDCCH) frequency-domain transmission resources corresponding to the user equipment; or
the UE specific sequence occupies a full bandwidth for transmission; or
the UE specific sequence is transmitted in an interlace manner.

10. The method of claim 7, wherein the user equipment detects the downlink control channel that schedules the transmission of the channel occupancy request signal according to a statically or semi-statically configured search space.

11. The method of claim 10, wherein the downlink control channel is a Physical Downlink Control Channel (PDCCH);
the number of PDCCH candidates in a PDCCH search space of the detected PDCCH is a fixed value.

12. The method of claim 7, wherein the control information comprises one or a combination of:
information of beam on which LBT is successful, 1-bit indication information of the channel occupancy request signal, and information related to a channel occupancy allow signal to be fed back by the user equipment;
wherein the information related to the channel occupancy allow signal fed back by the user equipment comprises one or a combination of:
frequency-domain information of the fed-back channel occupancy allow signal, time-domain information of the fed-back channel occupancy allow signal, LBT-related information used by the fed-back channel occupancy allow signal, and interlace information, allocated to the user equipment, of transmission of the fed-back channel occupancy allow signal.

13. A base station, comprising:
a processor configured to read programs in a memory to perform the process of:
determining a channel occupancy request signal to be transmitted, wherein the channel occupancy request signal is a request signal for requesting channel occupancy to a user equipment after the base station performs a Listen-Before-Talk (LBT) in a direction corresponding to at least one beam;
a transceiver configured to receive and transmit data under control of the processor to perform the process of:
scheduling transmission of the channel occupancy request signal on a downlink control channel;
wherein during the scheduling on the downlink control channel, control information on the downlink control channel is scrambled by a Radio Network Temporary Identifier (RNTI) dedicated to the channel occupancy request signal;
wherein the process further comprises:
transmitting a User Equipment (UE) specific sequence or a cell specific sequence before transmitting the control information scrambled by the RNTI; wherein the UE specific sequence is a UE specific reference signal; or the UE specific sequence is a part of a Wake-up Signal (WUS); wherein the UE specific sequence is a part of the WUS, comprising: the UE specific sequence is a subset corresponding to a Radio Resource Control (RRC) in a connected-state in a WUS sequence.

* * * * *